US006558548B2

(12) United States Patent
Svirklys et al.

(10) Patent No.: US 6,558,548 B2
(45) Date of Patent: May 6, 2003

(54) LAGOON COVERS PROVIDING MULTI-STAGE WASTE TREATMENT

(75) Inventors: Fred Svirklys, Ontario (CA); Wallace McGregor, Spokane, WA (US); Ron Marsh, Gastonia, NC (US); Dennis Shanklin, Ladson, SC (US)

(73) Assignee: Odor Control Systems, Inc., Shelby, NC (US)

( * ) Notice: Subject to any disclaimer, the term of this patent is extended or adjusted under 35 U.S.C. 154(b) by 8 days.

(21) Appl. No.: 09/972,680

(22) Filed: Oct. 8, 2001

(65) Prior Publication Data

US 2002/0139742 A1 Oct. 3, 2002

Related U.S. Application Data

(60) Provisional application No. 60/238,818, filed on Oct. 6, 2000.

(51) Int. Cl.[7] .............................. C02F 3/00; B01D 53/85
(52) U.S. Cl. ...................... 210/603; 210/615; 210/150; 210/188; 210/916; 55/514; 95/273; 435/266; 442/30; 442/56; 442/221; 442/227; 442/315; 442/375
(58) Field of Search ................................ 210/603, 615, 210/747, 150, 151, 170, 188, 218, 916, 242.1; 55/512, 514; 95/273; 435/266; 442/30, 56, 221, 226, 227, 315, 370, 374, 375

(56) References Cited

U.S. PATENT DOCUMENTS

| | | |
|---|---|---|
| 2,796,399 A | 6/1957 | Sanders et al. |
| 3,113,924 A | 12/1963 | Mendius, Jr. |
| 4,066,400 A | 1/1978 | Cox et al. |
| 4,165,281 A | 8/1979 | Kuriyama et al. |
| 4,169,050 A | 9/1979 | Serfling et al. |
| 4,201,663 A | 5/1980 | Rollag et al. |
| 4,672,691 A * | 6/1987 | De Garie et al. ........... 210/218 |
| 4,806,148 A * | 2/1989 | Ottengraf .................... 210/916 |
| 5,049,265 A * | 9/1991 | Boyd et al. .................. 210/150 |
| 5,105,496 A | 4/1992 | Gray, Jr. et al. |
| 5,228,998 A | 7/1993 | DiClemente et al. |
| 5,232,586 A | 8/1993 | Malone |
| 5,232,676 A * | 8/1993 | Wolff et al. ................. 210/615 |
| 5,400,549 A * | 3/1995 | Morgan |
| 5,431,808 A * | 7/1995 | Zumbragel ................... 210/188 |
| 5,480,538 A | 1/1996 | McCombs et al. |
| 5,486,292 A | 1/1996 | Bair et al. |
| 5,562,759 A | 10/1996 | Morgan et al. |
| 5,580,770 A | 12/1996 | DeFilippi |
| 5,700,687 A | 12/1997 | Finn |
| 5,714,379 A | 2/1998 | Phipps, Jr. |
| 5,861,095 A * | 1/1999 | Vogel et al. ................. 210/150 |
| 5,962,309 A | 10/1999 | Kumagai et al. |
| 5,980,738 A | 11/1999 | Heitkamp et al. |
| 6,022,479 A | 2/2000 | Smirnov |
| 6,069,003 A | 5/2000 | Ahlqvist |
| 6,086,755 A | 7/2000 | Tepper |
| 6,087,159 A | 7/2000 | Finn |
| 6,136,194 A * | 10/2000 | Vogel et al. ................. 210/615 |

FOREIGN PATENT DOCUMENTS

| | | |
|---|---|---|
| DE | 34 28 798 A | 8/1985 |
| DE | 44 40 464 C | 6/1996 |
| DE | 197 27 275 A | 1/1999 |

* cited by examiner

*Primary Examiner*—Christopher Upton
(74) *Attorney, Agent, or Firm*—Alston & Bird LLP

(57) ABSTRACT

The present invention is waste treatment apparatus and process for diminishing the emission of malodorous off-gases during waste treatment. The apparatus typically includes a floatation panel formed from bonded foam particles that is adhered to a fabric layer. The present invention provides a reliable, cost-effective means by which to decrease the noxious odors generally associated with waste treatment.

44 Claims, 3 Drawing Sheets

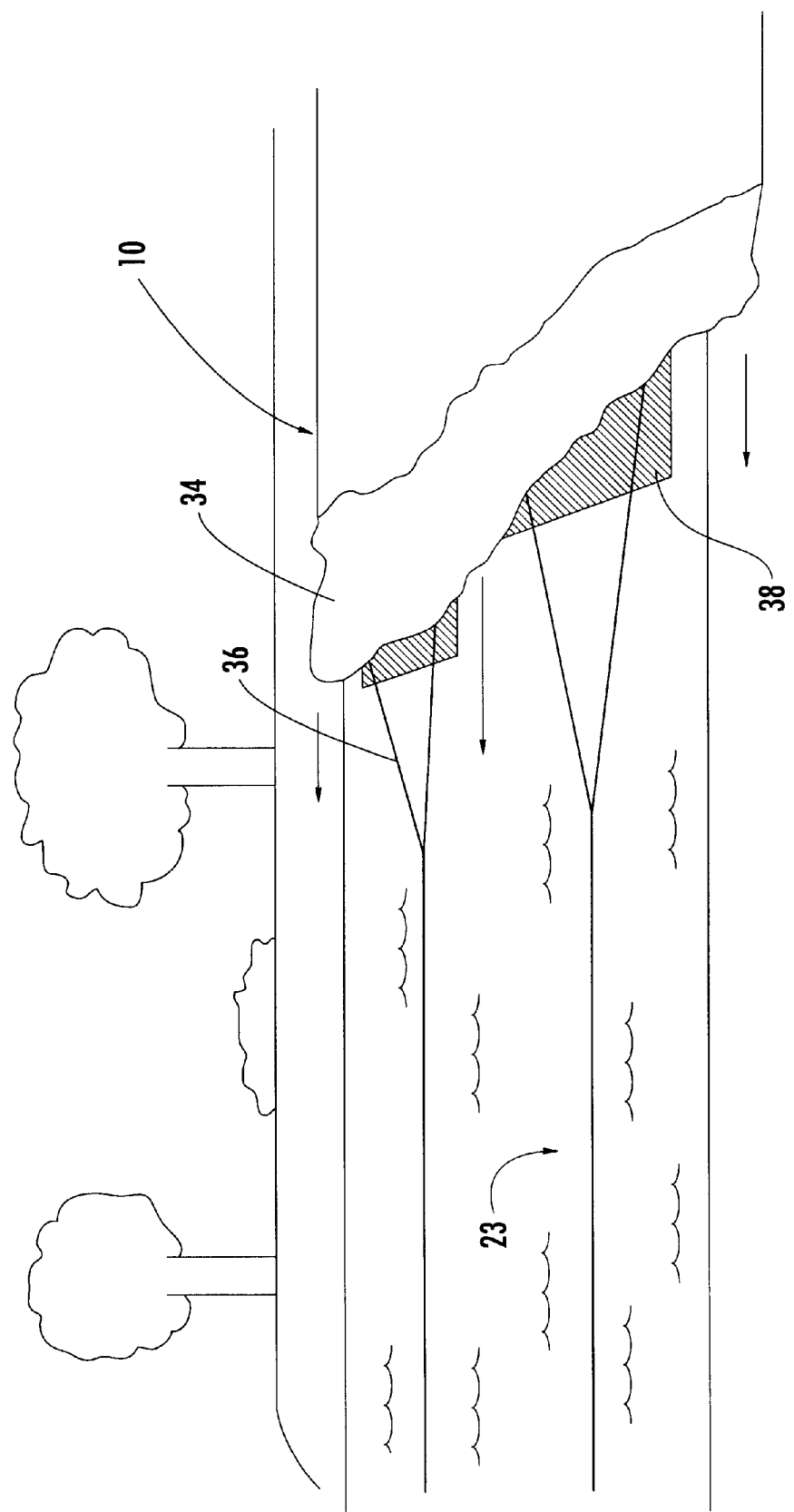

LAGOON COVERS PROVIDING MULTI-STAGE WASTE TREATMENT

CROSS-REFERENCE TO RELATED APPLICATIONS

This application claims the benefit of U.S. Provisional Application Ser. No. 60/238,818, filed Oct. 6, 2000, under 35 U.S.C. §119(e), which is hereby incorporated herein in its entirety by reference.

FIELD OF THE INVENTION

This invention generally relates to waste material confinement areas. More specifically, the present invention relates to covers for use in conjunction with such waste material confinement areas. The invention further relates to methods by which to use and produce such covers.

BACKGROUND OF THE INVENTION

Waste material confinement areas, such as slurry tanks, ponds, concrete cells and waste lagoons are widely used in the treatment of organic waste, including human, animal, and food processing waste. Waste lagoons are especially economically attractive to livestock producers, such as confinement swine producers. However, odors generated from waste material confinement areas, particularly waste lagoons employed in livestock production, must be significantly reduced in order to meet environmental challenges and to avoid exposing the general public to malodorous fumes. Aerobic and anaerobic microorganisms are commonly used to decompose the materials comprising the organic waste. Unfortunately, gases generated by the microorganisms during the decomposition process can be malodorous.

Treatment processes employing anaerobic microorganisms are the most common. Anaerobic microorganisms naturally develop within the depths of waste material confinement areas, due to the lack of available oxygen. Regrettably, anaerobic microorganisms generate numerous malodorous gases during the decomposition process. These off-gases bubble up through the waste liquid and are problematic if allowed to enter the atmosphere.

The familiar smell of ammonia and the "rotten egg" odor of hydrogen sulfide gas are typical of the odors produced during anaerobic decomposition. The metabolism of animal waste within a lagoon typically produces methane gas, carbon dioxide in solution and as a gas, hydrogen sulfide in solution and as a gas, and various volatile organic compounds. In fact, nearly two hundred odorous gases have been documented as a result of manure, rendered or processed animal waste and carcass decomposition, including volatile organic compounds such as para-cresol, phenol, indole and satol, and reduced sulfur gases. Several of the gases produced by anaerobic decomposition are especially malodorous, particularly volatile fatty acids.

Off-gases from anaerobic lagoons can pose other problems, as well. For example, ammonia emissions from anaerobic waste lagoons may contribute to acid rain. Methane emissions from anaerobic lagoons may contribute to global warming.

To capture noxious off-gases, anaerobic waste treatment processes generally employ an impermeable cover to encapsulate waste lagoon surfaces and capture the off-gases as they are released. The cover is typically formed from a polymeric film, such as a polyethylene membrane, suspended above the slurry. Gases trapped under the impermeable cover are subsequently removed by gas collection pipes, weighted sunken troughs, sump pumps, and the like. Such gas collection systems are described in U.S. Pat. No. 5,562,759. However, such covers and gas collection systems are expensive, require substantial support equipment, require time consuming and costly maintenance, are vulnerable to puncture, weather, vandalism, fatigue, and deterioration.

In contrast, wastewater treatment processes employing aerobic microorganisms do not utilize such impermeable membranes. In fact, rather than producing malodorous off-gases, aerobic microorganisms convert waste into innocuous compounds, such as carbon dioxide or nitrites. Further, aerobic microorganisms can degrade malodorous off-gases, such as the volatile fatty acids produced during anaerobic treatments. The aerobic bacteria transform the animal waste into a chemically stable material, reducing both pathogens and odor. Some types of aerobic microorganisms "digest" or oxidize carbohydrates to carbon dioxide and water. Other strains feed on organic substances and convert nitrogen compounds to ammonium. Still others oxidize ammonium salts to nitrites and nitrites into nitrates in a process referred to as "nitrification."

The aerobic microorganisms may be cultured on substrates submerged within the waste lagoon. However, aerobic microorganisms require oxygen to survive. Therefore, conventional aerobic processes used to treat liquid sludge must mechanically inject air into the waste water, which consumes energy, is costly, and requires maintenance. Further, such aerobic treatments do not totally eliminate the emission of gases having a foul odor, and present technology does not offer any effective odor control for this type digestive system. Numerous patents are directed to waste water treatment systems employing submerged aerobic microorganisms, including U.S. Pat. Nos. 4,165,281; 5,228,998; 6,022,476; 5,232,586; 5,861,095; 5,496,292; 5,580,770; 5,962,309; and 5,980,738.

In addition to submerged aerobic systems, aerobic microorganisms can also be used to treat noxious gas streams. For example, aerobic microorganisms can be grown on media which is either suspended within a closed vessel or floating on the surface of the waste slurry. The noxious gases are then treated as they diffuse though the suspended or floating media, commonly referred to as a "bio-filter." Exemplary media employed to date includes floating organic matter, such as compost or peat moss, as well as synthetic materials for use in closed vessels.

However, aerobic gas scrubbing systems require a delicate balance of environmental conditions for the continued support of aerobic microorganisms. As noted above, aerobic microorganisms require air to survive. Therefore, once the host media becomes submerged, the function of the aerobic microorganism is terminated in the absence of mechanically introduced oxygen. However aerobic microorganisms can not survive in the total absence of water. Therefore, the bio-filter must be kept moist. Floating organic matter, lacking both sufficient buoyancy and structural integrity, is unstable and short lived as an aerobic bio-filtration substrate due to submersion. Aerobic filtration media suspended within vessels are problematic also, in that such systems require the mechanical introduction of moisture, such as by the use of spray nozzles and the like. Bio-filters employed to scrub gases within a reaction vessel are described in several patents, including U.S. Pat. Nos. 5,480,538; 6,069,003; and 5,714,379. Further, in vessel-type biofilters, the offensive gases must be collected first and then passed through the media. The existing technology and high cost of implementation limits the effectiveness to relatively small, confined areas and is presently too expensive for a majority of applications.

SUMMARY OF THE INVENTION

The present invention provides cost effective, sound waste treatment systems for a wide variety of waste material confinement areas, such as waste lagoons. The waste treatment systems generally include an anaerobic waste material confinement area and a waste material confinement area cover. The waste material confinement area covers of the present invention treat the off-gases produced by the anaerobic microorganisms within the depths of the waste lagoon, thereby eliminating the noxious odors commonly associated with such anaerobic decomposition. The waste material confinement area covers of the present invention are easily installed, highly buoyant, and structurally sound. The waste material confinement area covers are generally formed from two or more floatation panels joined by a fabric layer.

The floatation panels generally include a plurality of polymeric foam particles arranged in a piled laminate structure. At least a portion of the foam particles exhibit a surface energy differential in comparison to water sufficient to wick an adequate amount of water onto the foam particles to collectively sustain a biofilm supported by the floatation panel. At least a portion of the polymeric foam particles within the piled laminate structure are further bonded to at least one adjoining foam particle positioned either above or below the foam particle.

The piled laminate structure generally defines a first face and an opposing second face, the first face contacting an aqueous waste slurry at or near its surface. At least a portion of the foam particles further exhibit sufficient buoyancy to collectively float the floatation panel. The foam particles are arranged within the piled laminate structure so as to define interstices between at least a portion of the foam particles. The interstices are of sufficient size and quantity to allow gases and rainwater to flow through the piled laminate structure.

The polymeric foam particles within the floatation panels can be formed from one or more polymers selected from polyolefin, polyvinyl acetate and polyurethane. In advantageous embodiments, the polymeric foam particles are formed from either polyethylene, polypropylene or a mixture thereof. The polymeric foam particles generally range in diameter from about 0.5 to 2.0 inches. The polymeric foam particles can be bonded by any means, including thermal bonding, needlepunching, stitching and chemically binding. Advantageously, the polymeric foam particles are thermally bonded. In an alternative embodiment, the polymeric foam particles are needlepunched. In a further alternative embodiment, the polymeric foam particles are bonded by chemically binding.

Floatation panels of the present invention generally range in thickness from about 0.5 to about 2.0 inches. The instant floatation panels further typically exhibit a density ranging from about 1.5 to about 4.0 $lb/ft^3$. In advantageous embodiments, the floatation panel can further include a fabric layer bonded to at least a portion of its first face. In beneficial aspects of that embodiment, the fabric layer bonded to the first face can be a nonwoven fabric.

As noted above, to form the waste material confinement area covers of the present invention, two or more floatation panels are joined using a fabric layer. The fabric layer may cover at least a portion of the second face of the floatation panel. In beneficial aspects, the fabric is formed from a fiber mixture including a first portion of fibers having a denier ranging from about 15 to 45 and a second portion of fibers having a denier ranging from about 3 to 10 denier. The fabric may be formed from numerous materials, including polyester, nylon, glass fiber, acrylic, flax, and polyolefin, including polypropylene and polyethylene, and mixtures thereof. In advantageous embodiment, the fabric is formed from polyester or acrylic fiber or a mixture thereof. The fabric may have any construction. In one aspect of the invention, the fabric layer is a nonwoven fabric. The fabric layer further generally exhibits a fabric weight ranging from about 14 $oz/yd^2$ to 35 $oz/yd^2$.

In beneficial aspects of the invention, the fabric layer can further comprise an entrapped adsorbent material. Exemplary adsorbent materials can be selected from zeolite, peat moss, activated carbon, and mixtures thereof. In one beneficial embodiment, the adsorbent material is zeolite. The adsorbent material may advantageously be present within the fabric in amounts ranging from about 0.5 to 10 $g/m^2$.

In beneficial embodiments, the waste material confinement area covers of the present invention exhibit a buoyancy ranging from about 0.5 to 6 $lb/ft^2$. Waste lagoon covers in accordance with the invention are further capable of decreasing ammonia emissions from a waste lagoon by a minimum of about 44%.

The invention further includes waste treatment systems including the beneficial waste material confinement area covers of the present invention. The waste treatment systems generally include a waste material confinement area containing water and organic waste and further supporting anaerobic microorganisms below the surface of the water and a waste material confinement area cover spanning the surface of the waste material confinement area. The waste treatment system can further include an anchor to secure the waste material confinement area cover around the perimeter of the waste material confinement area.

The present invention also encompasses methods of waste water treatment, which generally include supplying organic waste to a waste material confinement area; covering the surface of a waste material confinement area with a waste material confinement area cover of the present invention; providing an anchor around the perimeter of the waste material confinement area; and securing the waste material confinement area cover with the anchor. The waste water treatment methods of the present invention generally involve anaerobically digesting organic waste within the depths of a waste material confinement area and scrubbing the off-gases emitted during anaerobic digestion by diffusing them through a floatation panel prior to emitting the scrubbed gas stream into the atmosphere. In an alternative embodiment, the scrubbed gas stream may be passed through adsorbent filtration media prior to emitting the scrubbed gases into the atmosphere. In beneficial aspects of that embodiment, the adsorbent filtration media includes a layer of fabric containing entrapped adsorbent material.

The waste material confinement area covers, floatation panels and methods of the present invention can be used in a variety of waste treatment applications. Benefits of the present invention include a reduction in off-gas emissions from anaerobic waste lagoons. The present invention further provides reliable, durable, cost-effective waste treatment processes.

Further understanding of the methods and systems of the invention will be understood with reference to the brief description of the drawings and detailed description that follows herein.

BRIEF DESCRIPTION OF THE DRAWINGS

FIG. 3 illustrates a schematic view of a lagoon cover of the present invention being positioned over a waste lagoon.

DETAILED DESCRIPTION OF THE INVENTION

The present invention now will now be described more fully hereinafter with reference to the accompanying drawings, in which advantageous embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
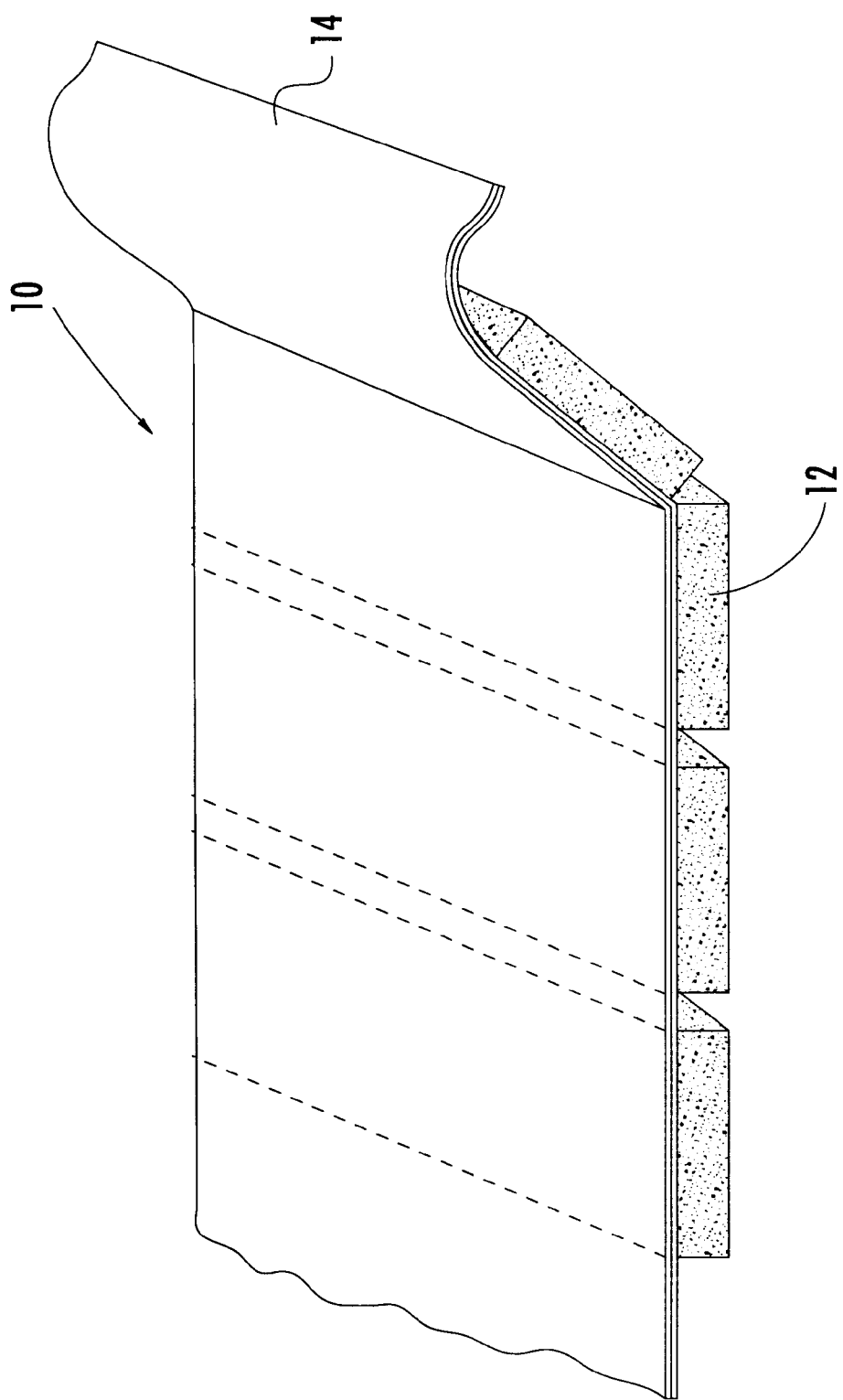
FIG. 1 illustrates a schematic top perspective view of one advantageous embodiment of the lagoon cover of the present invention.

Referring now to FIG. 1, a schematic representation of a waste material confinement area cover in accordance with advantageous embodiments of the present invention is provided. The waste material confinement area cover 10 (hereinafter referred to simply as the "cover") is generally formed from two or more floatation panels 12 joined by a fabric layer 14.

Figure 2:
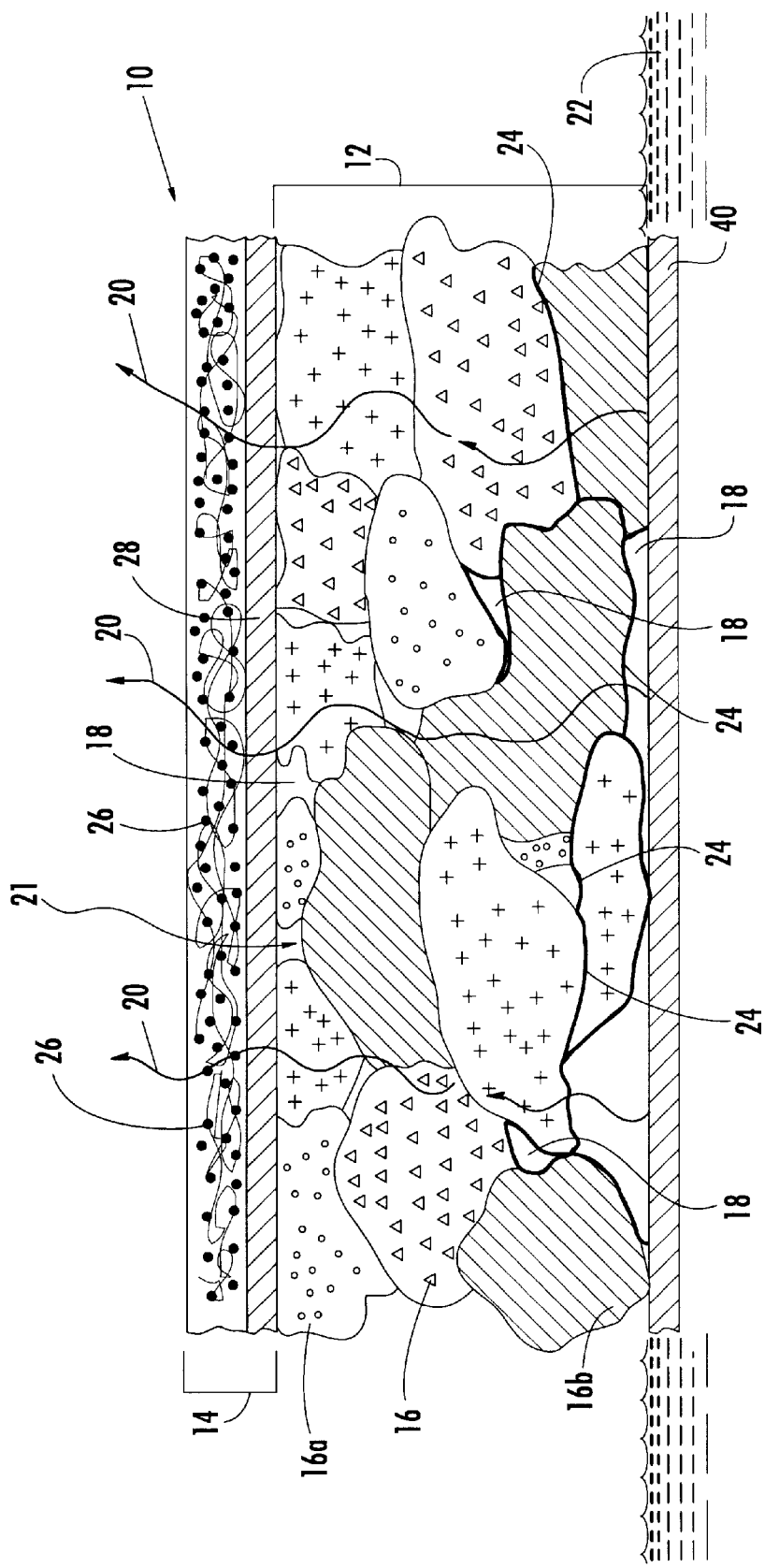
FIG. 2 illustrates a greatly enlarged schematic cross sectional view of one embodiment of the lagoon cover of the present invention.

FIG. 2 provides a grossly enlarged cross sectional view of a section of an exemplary cover 10 suitable for use in the present invention. In general, the floatation panel 12 portion of the cover 10 is formed from foam particles 16 of various sizes, shapes and densities that have been bonded together to provide a cohesive structure. Further, the foam particles forming the floatation panel 12 are typically randomly arranged into a piled laminate structure.

The foam particles 16 that form the floatation panel 12 generally range in size from about 0.5 to 2.0 inches. In advantageous embodiments, foam particles having a wide variety of sizes are incorporated into the flotation panel 12. In one beneficial embodiment, the foam particles 16 have an average diameter of about 0.5 inches. The foam particles 16 may have any shape, and in advantageous embodiments a variety of shaped foam particles 16 are included in the floatation panel 12.

Any suitable polymeric foam can be shredded or chopped to form the foam particles 16. Exemplary foams include any thermoplastic, thermoset or engineered foam. Suitable foams for use in the invention include polyolefin foams, including polyethylene and polypropylene foams, ethylene vinyl acetate foam, and polyurethane foam. As used herein, the term "polyethylene" encompasses low density, linear low density, and high density polyethylene. A majority of the polymeric foam particles 16 should be formed from closed cell foams to provide sufficient buoyancy. Advantageously, from 90 to 100% of the polymeric foam particles 16 are formed from closed cell foam. In one particularly advantageous embodiment closed cell foam formed from polyethylene is employed.

The foam particles 16 can further be formed from cross-linked foam to enhance its strength, chemical resistance, weather resistance and durability. In one advantageous aspect of the invention, the foam particles 16 are formed from cross-linked polyethylene foam. In a further beneficial embodiment, the foam particles 16 are formed from cross-linked closed cell polyethylene foam. The foam particles may further be formed from recycled polymer, such as closed cell recycled polyethylene foam.

An exemplary polyethylene foam construction for use as a floatation panel 12 of the present invention is available commercially from Max-Mor Technologies, Inc. of Shelby, N.C. as 3RDFB® Foam. Other suitable commercially available foams suitable for use as the floatation layer 12 include 3RD®, 3RDB®, 3RDF®, and 3 RHD® foams, also available from Max-Mor Technologies.

The foam particles 16 within the floatation panel 12 are bonded together to provide a cohesive structure. More particularly, the floatation panel 12 is advantageously durable, e.g. able to withstand the elements, such as rain, snow, hail and the like. To provide a cohesive structure, at least a portion of the foam particles 16 within the floatation panel 12 are bonded to at least one adjoining foam particle positioned either above or below them, as illustrated in FIG. 1 as 16a and 16b, respectively.

However, although at least a portion of the individual foam particles 16 are bonded together, void spaces 18 are present between the foam particles 16 to ensure that the floatation panel 12 provides suitable gas diffusion properties, i.e. the off-gases 20 rising from the surface of the lagoon 22 are allowed to diffuse through the floatation panel 12, along with ambient air 21. Stated differently, sufficient void spaces remain between at least a portion the foam particles 16 to allow unobstructed passage of the off-gases 20 and air 21 through the floatation panel 12. The floatation panels 12 thus typically exhibit a gas permeability of greater than 4 cfm at 0.75 inch pressure drop.

The void spaces 18 present between the foam particles 16 further allow water to pass through the floatation panel 12, thus avoiding inundation during rainstorms and the like. To ensure adequate liquid transport, the floatation panel generally exhibits a water permeability with an applied load of 20 KN of greater than 0.036 m/s in the horizontal direction and greater than 0.032 m/s in the vertical direction.

Floatation panels 12 suitable for use in the present invention are typically further characterized by buoyancy capable of supporting about 0.5 to 6 lb/ft$^2$. Therefore, to ensure sufficient buoyancy, at least a portion of the foam particles 16 forming the floatation panels 12 have a density less than water, i.e. less than 1.0 g/cc. More particularly, at least a portion of the foam particles 16 exhibit sufficient buoyancy to enable the foam particles 16 to collectively float the floatation panel 12. In advantageous embodiments, the resulting floatation panel 12 has an overall density ranging from about 1.5 to about 4 lb/ft$^3$. In alternative aspects of the invention, the floatation panel 12 may have a density of up to 20 lb/ft$^3$.

In addition to beneficial gas diffusion and buoyancy properties, Applicants believe that the floatation panels 12 provide advantageous wicking properties, as well. For example, it is believed that some or all of the surfaces of the foam particles 16 are coated by a thin layer of liquid water or water vapor. More particularly, although buoyantly suspended within the lagoon, the floatation panel 12 nevertheless contacts the surface of the waste material confinement area 22. In fact, a minimal amount of the bottommost portion of floatation panel 12 may be submerged within the aqueous waste slurry contained within the waste material confinement area 22. As noted earlier, the foam particles 16 within the floatation panel 12 are formed from polymeric materials. Polymeric materials typically possess a significantly lower surface energy than water. It is therefore believed that the differential in surface energy between the polymeric foam surface and the water within the waste material confinement area 22 induces sufficient capillary attraction to wet out at least a portion of the surface of some or all of the foam particles 16 comprising the floatation panel 12 or to otherwise humidify the environment within the floatation panel 12. As noted herein, the terms "capillary attraction" and "wicking" are used interchangeably. In addition, the off-gases emitted from the waste material confinement area 22 may carry liquid into the floatation panel 12.

Although not wishing to be bound by theory, it is believed that the balance of gas diffusion and wicking properties provided by the floatation panels 12 gives rise to an organic crust within the floatation panels, i.e., the floatation panels are bioactive. As used herein, an organic crust is defined as a combination of gas permeable space and suitable aerobic environment for sustaining a bacterial and/or microorganism population. More particularly, Applicants believe that the floatation panel may support a variety of bacteria, microorganisms, and the like. For example, the floatation panel 12 may support algae and photosynthetic bacteria on the portion of its surface receiving sunlight. Bacteria, actinomycetes and fungi may be supported within the depths of the floatation panels 12.

Returning now to FIG. 2, the floatation panels 12 are preferably constructed to provide significant void spaces 18, or interstices, between the individual foam particles 16, as noted above. It is hypothesized that the void spaces 18 may provide surfaces on which to culture and protect naturally occurring microorganisms, such as aerobic microorganisms. Thus the floatation panels 12 may reduce odor emissions by providing biological treatment to the gases generated by the anaerobic bacteria within the lagoon. In particular, the malodorous off-gases 20 produced during anaerobic decomposition may diffuse through the floatation panel 12, and contact microorganisms cultured on the surfaces of the void spaces 18.

Optionally, the flotation panel may include a textile layer 40, generally positioned between the foam particles 16 and the waste material confinement area 22 following installation. The textile layer 40 can be formed from any textile construction, including nonwoven, woven, net and knit fabrics. In advantageous embodiments the textile layer 40 is a nonwoven fabric. In one advantageous aspect of that embodiment, the textile layer 40 is a felt-like nonwoven fabric. The textile layer 40 may be formed from any environmentally resistant fiber, including polyester, nylon, glass fiber, acrylic, flax, polyolefin, including polypropylene, polyethylene, and the like. The textile layer 40 may be of any suitable fabric weight, and is advantageously a light weight fabric.

The foam particles 16 can be bonded together to form the floatation panel 12 using a variety of techniques, including thermal bonding, needle punching, stitching, adhesives (also referred to as "chemically binding"), ultrasonic bonding, UV curing and the like.

In one advantageous embodiment, the foam particles 16 within the floatation panel 12 may be thermally bonded using a pair of platens supplying heated air, for example super heated air. In this advantageous embodiment, a layer of foam particles is piled in a random manner atop a first platen. The surface of the first platen supporting the layer of foam provides an array of holes to transport heated air into the layer of foam particles 16. In an alternative embodiment, a layer of textile material 40 is placed between the first platen and the foam particles 16. In one advantageous embodiment, the textile material 40 is a nonwoven fabric. A second platen, similarly defining an array of holes suitable to transport heated air, is brought into contact with the opposing surface of the layer of foam particles.

A sufficient amount of heated air is subsequently introduced through the platens to soften and bond the foam particles. The heated air is provided at a temperature suitable to soften the surface of the foam particles without inducing degradation. In one aspect of this advantageous embodiment, the top platen further applies pressure to the foam particles during the bonding process. In a further alternative embodiment, textile materials are bonded to both the top and the bottom of the floatation panel. More specifically, a second layer of textile material, such as a woven, nonwoven, knit or net fabric, may be placed between the second platen and the foam particles prior to heating.

In an alternative advantageous embodiment, at least a portion of the foam particles are bonded using stitching or needlepunching. For example, foam particles can be piled in a random manner atop a first textile material, such as a nonwoven fabric. A second textile material, for example a second nonwoven fabric, may then be positioned over the top of the layer of foam particles. Exemplary fabric weights for the first and second textile material may range from about 4 to 35 oz/yd$^2$. Conventional needlepunch equipment, such as a two bed needlepunch commonly used in the production of nonwoven fabric, may then be employed to bind the foam particles and fabric into a cohesive structure. Yarns or filaments may further be inserted through the thickness of the layer of foam particles and the textile materials during the needlepunch process. Suitable textile materials for use in these aspects may be formed from any environmentally resistant fiber. Similarly, the inserted yarns or filaments may be formed from any environmentally resistant fiber. Exemplary environmentally resistant fibers include polyester, nylon, acrylic, flax, polyolefin, including polypropylene and polyethylene, and glass fiber or any other melt spinnable fiber, and mixtures thereof. Polyester may also advantageously be employed, particularly UV resistant polyester, such as carbon black filled polyester.

The floatation panels 12 may be provided in any suitable shape. In one beneficial embodiment, the floatation panels are rectangular in shape, such as an approximately 39 inches wide by 88 inches long rectangle. The floatation panels 12 suitable for use in the present invention typically range in thickness from about 0.5 to 4 inches. In one advantageous embodiment, the floatation panel 12 is approximately 1.6 inches thick.

The floatation panels 12 typically exhibit a tensile strength of greater than about 9 k/nm. The floatation panels 12 further generally exhibit an ultimate elongation of about 575%, a compressive creep at a dynamic load of 1,235 lb/ft$^2$ of about −25% and a surface hardness ranging from about 50 to 85 shore A.

As indicated in FIG. 2, the floatation panel 12 may further include a fabric layer 14. The fabric layer 14 is typically bonded to the floatation panel 12 on the surface opposing the waste confinement area 22, and is generally employed to bond two or more floatation panels 12 into a unitary structure.

The fabric layer 14 may be formed from any suitable weather resistant material. Exemplary weather resistant material for use in the fabric layer 14 includes polyester, nylon, acrylic, flax, polyolefins, including polypropylene and polyethylene, glass fiber or any other melt spinnable fiber, and mixtures thereof. In one beneficial embodiment, polyester is included in the fabric layer 14, particularly UV resistant polyester, such as polyester filled with carbon black. In a further advantageous embodiment, the fabric layer 14 includes acrylic, either alone or in conjunction with polyester or other fiber.

The fabric layer 14 may be formed from any suitable fabric construction. Exemplary fabric constructions include nonwoven, woven, knit and net constructions. In one beneficial embodiment, the fabric layer 14 can be formed from nonwoven fabric. The fabric layer 14 can advantageously range in weight from about 6 to 35 oz/yd².

The fabric layer 14 is also advantageously durable, e.g. able to withstand the elements, such as rain, snow, hail and the like. Further, the fabric layer 14 should also have a permeability and diffusivity sufficient to allow off-gases 20 emitted from the lagoon 22, ambient air 28, and rainwater to pass through. The fabric layer 14 should also provide a sufficient amount of flexibility, to allow sections of the floatation cover 10 to be folded back on itself if desired, such as during installation or removal. The fabric layer 14 further typically exhibits both a puncture strength of at least 150 pounds as measured via ASTMD 4833 and a trap tear strength of at least 65 pounds, as measured via ASTM D4533.

Although not wishing to be bound by theory, the fabric layer 14 may also provide a bioactive substrate. More particularly, the fabric layer 14 can provide a substrate on which algae, bacteria, and the like may be sustained over time. Applicants hypothesize that the capillary attraction induced within the floatation panel 12 may provide sufficient moisture to the fabric layer 14 as well. In fact, the fabric layer 14 may similarly wick the water present within the floatation panel 12.

In addition to its other functions, the fabric layer 14 may also provide the framework for an adsorptive filter that further removes any malodorous or otherwise noxious gases remaining in the off-gases that have diffused through the floatation panel 12, as shown in FIG. 2. The fabric layer 14 comprising such an adsorptive filter can be formed from any fabric construction designed to entrap and support a sufficient quantity of adsorbent material 26 within the fabric layer 14. Exemplary textile constructions for use in the fabric layer 14 include nonwoven, woven, knit and net fabrics.

In one beneficial embodiment, the fabric layer 14 comprising the adsorptive filter is a nonwoven fabric, such as a needle-punched fabric. The fabric layer 14 can be a needle-punched fabric that includes a mixture of high and low denier synthetic fiber to provide adequate void volume and support for the adsorbent material 26. In particular, high denier fiber can be used to provide larger fiber interstices, i.e. void volume, for particulate entrapment. Low denier fiber can be incorporated into the non-woven to provide support to the adsorbent material 26 following entrapment. The needle-punched fabric can optionally include a weather resistant scrim 28, into which weather resistant synthetic fiber has been secured. The scrim may be formed from any suitable material, including polyester, nylon, glass fiber, acrylic, flax, polyolefin, and mixtures thereof. Polyolefin scrims include polyethylene and polypropylene scrims.

The high and low denier fibers may be formed from any weather resistant polymer. Exemplary high and low denier synthetic fibers include polyester, nylon, acrylic, flax, polyolefin, including polypropylene, and polyethylene, glass fiber or any other melt spinnable fiber, and mixtures thereof. In one advantageous embodiment, the high and/or low denier fiber includes polyester fiber, particularly UV resistant polyester such as polyester that has been filled with carbon black. In a further advantageous embodiment, the high and/or low denier fiber includes acrylic fiber, either alone or in conjunction with polyester or other fiber. The high and low denier synthetic fibers may further be either staple or continuous filament fiber.

In beneficial embodiments, the high denier fiber has a denier ranging from about 15 to 45 denier. In particularly advantageous embodiments, the high denier fiber is 45 denier. In further beneficial embodiments, the low denier fiber has a denier ranging from about 3 to 10 denier. In particularly advantageous embodiments, the low denier fiber is 6 denier. The high denier fiber is typically present in amounts ranging from 8 to 23 oz/yd². The low denier fiber is typically present in amounts ranging from about 6 to 12 oz/yd². The overall fabric layer 14 weight for aspects of the invention directed to adsorptive filters generally ranges from about 14 to 35 oz/yd². One exemplary process by which the high and low deniers may be incorporated into the fabric layer 14 includes initially forming a needlepunched fabric from the low denier fibers and subsequently needlepunching in the high denier fibers. The high and low denier fibers typically aggregate toward opposing sides of the fabric layer 14.

The adsorbent material 26 may be comprised of any suitable material capable of selectively adsorbing noxious or malodorous gases. In advantageous embodiments, the adsorbent material 26 is a particulate. Exemplary adsorbents include zeolite, peat moss, activated carbon and the like, and mixtures thereof. In one beneficial embodiment, the adsorbent particulate is zeolite. As used herein, the term "zeolite" includes natural zeolites and synthetic zeolites.

Zeolite provides both selective adsorption of malodorous gases and ion exchange properties. Zeolites are generally negatively charged frame work silicates formed from interlocking tetrahedrons of $SiO_4$ and $AlO_4$. Zeolites have large vacant spaces, or channels, that allow molecules to pass through. In a particularly beneficial embodiment, zeolite having channel diameters ranging from about 2.5 to about 5.0 angstroms in diameter is employed. In advantageous embodiments, the zeolite is clinoptilolite, such as product codes TSM 140 and CS 400 clinoptilolites produced by Steelhead Specialty Minerals of Spokane, Wash.

The adsorbent material 26 is present in an amount sufficient to further remove malodorous gases from the treated off-gases 20 exiting the floatation panel 12. For example, the adsorbent particulate may be present in the fabric layer in amounts ranging from 0.5 lb/ft² to 10.0 lb/ft², preferably about 1.0 lb/ft². The adsorbent material particle size may also advantageously be selected to be small enough to allow it to embed into the fabric layer yet large enough that it does not sift through the fabric layer. Although any suitable particle size may be employed, the adsorbent material particle size typically ranges from about −40 to −100 standard mesh. Although again not wishing to be bound by theory, it is also believed that the adsorbent material 26 may provide minerals that assist in the sustenance of bacteria and the like which may be cultured within the fabric layer 14.

Returning now to FIG. 1, the cover 10 is generally formed from at least two floatation panels 12 adhered to a common fabric layer 14. Among its other attributes, the fabric layer 14 provides stability and cohesion to the floatation panels 12 that make up the cover 10.

The waste material confinement area covers of the present invention are suitable for use on a variety of bodies and configurations of waste water. The waste material confinement area may contain any organic waste slurry, including animal, human, plant or other food processing waste. As known in the art, organic waste slurries are typically aqueous based. The waste material confinement area may thus have any "wet" configuration designed to contain aqueous waste slurries, such as waste lagoons, ponds, tanks, concrete cells or other holding vessels. In further advantageous embodiments, the waste material confinement area may be a "dry" system, such as a landfill. Although referred to in the art as a "dry" system, such systems nevertheless contain at least a minimal amount of moisture, and may be considered aqueous waste slurries for the purposes of the present invention.

Among their many beneficial attributes, the covers 10 of the present invention can be highly buoyant. For example, the covers 10 are advantageously capable of supporting an object weighing at least 250 lb. The covers 10 further generally exhibit a bouyancy ranging from about 0.5 to 6 lb/ft$^2$. The buoyancy, stability and durability provided by the covers 10 of the present invention can provide the additional benefit of allowing any point on the cover 10 to be readily accessed by merely walking across its surface. Such easy access allows the cover 10 to be thoroughly inspected over time and readily repaired.

In addition to its buoyancy, stability and durability, the covers 10 also allow rain water to pass through its thickness, thereby avoiding inundation during to rainstorms and the like. The covers 10 are further puncture and wind resistant, i.e., the covers 10 do not shift or substantially move in response to wind sweeping across the lagoon surface. The cover 10 is also gas permeable, allowing both the gases emitted from the lagoon and ambient air to pass through its thickness.

FIG. 3 depicts the installation of a cover 10 formed in accordance with the present invention. For the sake of illustration, the cover 10 is shown being installed on a waste lagoon 23. Prior to installation, the cover 10 is partially assembled at the edge of the lagoon 23 and each assembled section is then drug across the surface of the lagoon 23. A sheet of plastic film or the like may initially be spread out at the bank of lagoon 23 to provide a clean workspace for assembling the cover 10. A row of floatation panels 12 spanning the width of the lagoon 23 is laid out on the workspace at the bank of the lagoon 23 and adhered to the fabric layer 14.

The floatation panels 12 can be bonded to the fabric layers 14 using any suitable technique. In one advantageous embodiment, adhesive is used to attach the fabric layer to the floatation panels. The adhesive is beneficially selected and applied in a manner that is not detrimental to the gas diffusion and liquid transport properties of the floatation panels 12. For example, the adhesive may be applied in a discontinuous pattern. The adhesive can be any suitable weather resistant adhesive. Advantageously, a cross-linked polyurethane adhesive can be employed. The adhesive is further advantageously applied in an amount sufficient to prevent adhesive failure between the fabric layer 14 and the floatation panel 12. In embodiments in which the fabric layer 14 provides an adsorptive filtration layer, the low denier side of the fabric layer 14 is adhered to the floatation panels 12. To increase the stability of the resulting cover 10, the edges of adjacent floatation panels 12 may also optionally be adhered by any suitable means, such as heat bonding and the like.

As shown in FIG. 3, to aid in installation, an overhang 34 formed from a narrow strip of fabric layer may be provided before the foremost row of floatation panels 12. Ropes 36 are attached to the overhang so that the cover 10 can be pulled into place. Removable floats 38 may further be placed under the overhang to facilitate the installation process. Immediately prior to positioning the cover 10 over the surface of the lagoon 23, adsorptive material can be spread over the surface of the fabric layer. The cover 10 may then be pulled into place over the surface of the lagoon 23 using one or more tractors or the like. To secure the lagoon cover 10 into place, its outermost circumference may be secured in an anchor provided around the perimeter of the lagoon 23. In aspects of the invention directed to waste lagoons, the anchor is typically a trench. Exemplary anchors employed in conjunction with other aspects of the invention, e.g. tanks and the like, include any suitable fasteners, such as bolts and the like.

The waste material confinement area covers of the present invention remove a significant portion of the malodorous gases generated by conventional waste material confinement areas. For example, the waste material confinement area covers of the present invention reduce ammonia levels by up to 80%. Further, the waste material confinement area covers of the present invention provide a thermal barrier that can intensify and accelerate the anaerobic digestive activity within the waste lagoon. Further, the waste material confinement area covers of the present invention provide long life expectancies, are UV resistant, impervious to most chemicals, and retain their properties in temperatures ranging from about −50° C. to about 55° C.

The following non-limiting examples serve to further illustrate the invention.

EXAMPLES

Laboratory Scale Investigation

The efficacy of various filtration constructions was investigated on a laboratory scale by covering pails containing an animal waste slurry with various floatation panel configurations. Each of the pails was a vertical sided, food grade plastic pail filled approximately half full with a 5% slurry of pig manure. The various samples were floated on the surface of the slurry and covered approximately its entire exposed surface area (with the exception on Comparative Example 1). Each of the samples described in Table 1 was further produced in duplicate.

TABLE 1

Laboratory Scale Testing
Exemplary Constructions

| Sample | Construction |
|---|---|
| Comparative Example 1 | Liquid manure slurry without a floatation panel or other cover. Control sample. |
| Example 1 | A single layer of floatation panel. The floatation panel was 1.6 inches thick and formed from 3$^{RD}$FB ® foam, available from Max-Mor Technology, Inc. |
| Example 2 | A single layer of the floatation panel of Example 1, cut down to approximately half its original thickness. |
| Example 3 | A single layer of the floatation panel of Example 1, plus a fabric layer about 0.5 cm thick further containing peat moss and Sweet PDZ ® zeolite particles, marketed by Steelhead Specialty Minerals of Spokane, WA. |
| Example 4 | A single layer of the floatation panel of Example 1 topped with zeolite particles at a rate of one pound per square foot. |

The performance of the various examples was evaluated by measuring the ammonia concentration in the headspace over the pails. A measured volume of air over the headspace of each sample was passed through a dilute acid trap. The absorbed ammonia was measured using Nesslers reagent to provide color, which was subsequently quantified using a spectrophotometer. After allowing the samples to equilibrate for one week, measurements were made at one week intervals for four weeks. The results provided in Table 2 are expressed in ammonia concentration in the dilute acid sampling tubes, ppb. The results provided in Table 3 represent the same data presented as percent reduction in ammonia emissions.

TABLE 2

Headspace Ammonia

| Sample | Wk 1 Ammonia, ppb | Wk 2 Ammonia, ppb | Wk 3 Ammonia, ppb | Wk 4 Ammonia, ppb |
|---|---|---|---|---|
| Comparative Example | 237 | 225 | 217 | 210 |
| Example 1 | 115 | 66 | 45 | 45 |
| Example 2 | 133 | 92 | 87 | 88 |
| Example 3 | 97 | 49 | 37 | 23 |
| Example 4 | 67 | 43 | 23 | 25 |

TABLE 3

Percent Ammonia Reduction in Headspace

| Sample | Week 1 | Week 2 | Week 3 | Week 4 | Average |
|---|---|---|---|---|---|
| Example 1 | 51 | 71 | 79 | 79 | 70 |
| Example 2 | 44 | 59 | 60 | 58 | 55 |
| Example 3 | 59 | 78 | 83 | 89 | 77 |
| Example 4 | 72 | 81 | 89 | 88 | 82 |

As indicated in Tables 2 and 3, the floatation panels of the present invention significantly reduce ammonia emissions. Further, the floatation panels became more effective over time. This trend may indicate an increase in the bacterial population within the floatation panels over time, as well.

Field Testing

To evaluate the effectiveness of an exemplary lagoon cover, a farm was selected that had a well established anaerobic lagoon serving a growing-finishing swine herd. The farm served two conventional, mechanically ventilated buildings with a total capacity of 1,224 feeder to finish pigs. The lagoon was designed to be 12 feet deep with 3:1 side slopes. The lagoon had a surface area of approximately 0.5 acres (0.2 ha). The lagoon was designed to provide 8 feet of permanent storage and 3 ft of temporary storage. Expected nitrogen production from the facility was calculated to require either 18 acres of Bermuda hay or 36 acres of corn. The lagoon cover generally included a plurality of floatation panels bonded to a common fabric layer that further contained embedded adsorbent material. A more detailed description of the lagoon cover specifications are provided in Tables 4 and 5.

TABLE 4

Floatation Panel Specification

| Property | Description or Value |
|---|---|
| Floatation Panel Construction | Foam structure formed from recycled post industrial, cross-linked, closed cell polyethylene foam particles having a nominal diameter of 0.5 inches that have been heat bonded |
| Dimensions | 1.6 in. thick, 39.5 in. by 88.5 in. |
| Density | 2 to 4 lb./cu. Ft. |
| Weight | 0.65 lb./sq. ft. |

TABLE 4-continued

Floatation Panel Specification

| Property | Description or Value |
|---|---|
| Water permeability with load of 20 kN applied | Horizontal: >0.036 m/s<br>Vertical: >0.032 m/s |
| Gas permeability | >4 cfm at 0.75 in. pressure drop |
| Tensile strength | 9k/Nm |
| Chemical resistance | Resistant to most chemicals including animal manures |
| Life expectancy | 10 to 20 years |

TABLE 5

Fabric Layer and Adsorbent Particulate Specification

| Property | Description or Value |
|---|---|
| Fabric Layer Construction | Carbon black filled polyester fabric with entrapped Clinoptilolite CS 400 zeolite at a coverage of one pound per sq. ft. |
| Dimensions | 0.25 in. by up to 35 ft. by 200 ft. rolls |
| Weight | About 30 oz./yd$^2$ |
| Water permeability | High |
| Puncture strength (ASTM D 4833) | 150 lb. > 4 cfm at 0.75 in. pressure drop 65 pounds |
| Trap tear (ASTM D 4533) | |
| Chemical resistance | Resistant to most chemicals including animal manures |
| Life expectancy | 10 to 20 years |

The assembly procedure consisted of placing the floatation panels on the ground at a first assembly area, joining them together by heat bonding the salvage edge of the textile material of adjacent floatation panels to each other. After an area of floatation panels over 25 feet wide across the end was completed, rolls of the fabric layer were unrolled over the foam. The fabric layer was bonded to the floatation panels with an adhesive. Granular zeolite was then placed on the fabric layer at a uniform rate.

The completed section of lagoon cover was then drug across the surface of the lagoon. The assembly procedure was repeated until a dogleg was encountered in the lagoon terrain. At that time, a second assembly area was set up at the opposite end of the lagoon and the assembly procedure repeated. The two opposing sections of the lagoon cover were then joined with adhesive. Lastly, the entire perimeter of the lagoon cover was secured in a trench dug around the perimeter of the lagoon.

Bacterialogical Testing and Results

Samples of the lagoon cover were collected over time in an attempt to qualitatively investigate the bioactive material present. More particularly, samples were taken from the lagoon cover approximately two, three, five and nine months after installation.

a. Two Month Samples

The first set of samples, referred to as "the two month samples" consisted of a scraping from a 2"×2" portion of the lagoon cover surface and a 1"×½" section of the upper layer only. Following collection, the samples were immediately placed in a small volume of phosphate buffer solution. Extracts from the various cover components were then subjected to microscopic examination. Several of the slides were stained using methylene blue. Stained and unstained sample extracts were examined at 100× and 400× magnification.

i. Two Month Sample: Surface Scraping

The two month surface scraping showed the presence of a large mass of healthy, filamentous green algae. The large masses of algae on the lagoon cover indicated that sufficient moisture and nutrients were available to the algae. The algae had an estimated width of 25 to 30 microns or more and were septated with the chloroplasts filling the entire cell. The ends of the algae filaments were usually broken without any chloroplasts. A few end cells were pointed. There was a small mass of blue green bacteria, cocci in a clump. There was also a brownish organism that was later identified as a diatom without any protoplasm. There were also a few smaller, filamentous green algae clumps. The sample was reexamined after 10 days, and many motile bacteria were present within the sample, in addition to the algae.

Following storage in the laboratory for 10 days, a population of flagellated and free swimming, ciliated protozoa were also observed feeding on the bacteria. In addition, the number of motile bacteria increased tremendously. Consequently, the green algae appeared to be growing with sufficient vigor to keep the environment aerobic for both bacteria and protozoa. More particularly, the algae appeared to utilize carbon dioxide as its carbon source, releasing oxygen as an end product. Further, green algae do not fix atmospheric nitrogen. Therefore, the nitrogen appears to be provided by the lagoon, such as ammonia gas escaping from the lagoon surface. In addition, capillary action may have lifted liquid from the surface of the lagoon into the floatation cover to provide the moisture required for algae growth.

ii. Two Month Samples: Upper Layer Sample

The liquid from a well shaken sample vial containing a small piece of the lagoon cover indicated some clumps of small algae, as well as large green algae. The sample also contained clumped and filamentous bacteria. The Upper Layer Sample contained more dispersed bacteria than found in the surface scraping. There were also a number of diatoms present within the sample. After storage in the laboratory for 10 days, the sample contained large numbers of actively motile bacteria. There were also clumps of bacteria and large spherical cells resembling yeast cells. There were many free swimming ciliated protozoa and several immobile nematodes.

Stained slides of liquid squeezed from the cover sample indicated many more bacteria, including filamentous bacteria with a few spirillum. There were also clumps of bacteria with large capsules and diatoms. There were a large number of clumped algae cells resembling Chlorella. A few protozoa appear to have been present around the large algae filaments.

b. Three Month Samples

A second set of samples, referred to as "the three month samples" were gathered from two locations across the lagoon cover. The three month samples each included both the floatation panel and the fabric layer. One sample was taken from a point near where the manure enters the lagoon ("the inlet sample"). A second sample was taken from the storage area within the lagoon further from the lagoon inlet ("the storage sample"). Several slides were prepared for each of the inlet and storage samples. One set of slides was stained with methylene blue. The slides were all examined at 100× and 400× magnification.

i. Three Month Samples Taken From the Inlet

The inlet samples had the greatest microbial populations. Although the algae population had diminished significantly by the three month sampling (which was expected, as this sampling was performed in the winter), microscopic examination of the stained slides revealed that the inlet sample contained a significant quantity of dispersed aerobic bacteria, mainly single cells and diplo cells with numerous filamentous fragments. Bacteria was also present in various size floc particles. Overall, there were many more bacteria than were observed in the two month samples. The unstained samples indicated a significant quantity of bacteria, as well. Many of the bacteria were motile. The bacteria population may have included some sulfur oxidizing bacteria, Thiobacillus, and a few nitrifying bacteria. There were also some bacterial floc particles, ranging from a few bacteria to large numbers of bacteria. The large floc particles were so dense that only the bacteria at the edges could be observed.

Liquid extracted from the Inlet Sample also contained numerous active protozoa, ranging from tiny flagellated protozoa to larger stalked ciliated protozoa, Vorticella. There were many more protozoa than normally observed in activated sludge wastewater samples. The significant increase in protozoa in comparison to the Two Month Samples required a large number of bacteria in order to grow. In fact, the increased number of protozoa would not have occurred in the Inlet Sample without the continued growth of the bacterial population and adequate dissolved oxygen.

ii. Three Month Samples Taken From the Storage Area

The samples taken from the storage area contained less bacteria and protozoa than in the Three Month Inlet Samples. Most of the motile bacteria were large diplo cells, and there were some filamentous bacteria. The presence of tiny floc particles indicated that bacterial floc was just beginning to form within the Storage Area Samples.

iii. Comparison Between Two and Three Month Samples

Both three month samples showed a dramatic increase in bacteria from the two month samples. Specifically, significant amounts of bacterial floc were noted in the inlet samples. Bacteria tend to aggregate under the right environmental conditions to form floc structures. Floc is generally formed when nutrients have been reduced by bacterial metabolism. Further, the large number of bacteria observed in the inlet sample indicates the presence of a considerable amount of nutrients.

The large number of protozoa observed in the Three Month Sample depended upon a large bacterial population in order to thrive. More particularly, without continued growth of bacteria and adequate dissolved oxygen, the observed protozoa growth would not have occurred. Ciliated protozoa of the types observed in the inlet sample are aerobic in nature, requiring at least 1 mg/L DO in the environment. The presence of numerous types of protozoa indicates an active bacteria population stimulating protozoa growth under aerobic conditions. Because the green algae present in the Two Month Samples had disappeared, the oxygen appears to be provided by the air. A significant quantity of air must have been available at the liquid surface, as rapid metabolism under aerobic conditions requires the maintenance of a high oxygen concentration in the air next to the liquid.

c. Five Month Samples

A third set of samples were collected approximately five months after installation. Samples were taken from the inlet ("the inlet sample") and at a location towards the south end of the lagoon ("the southern sample"). Both samples were in two pieces: a top portion formed from the fabric layer attached to a first piece of felt-like nonwoven material, and a bottom portion formed from the floatation panel attached to a second piece of felt-like nonwoven material. Each of the samples was subjected to microscopic examination. Slides were made of each of the samples suspended in water. A second set of slides were prepared from dried samples that had been stained with methylene blue dye.

i. Five Month Inlet Sample (a) Top Portion of the Five Month Inlet Sample

The fabric layer of the Inlet Sample Top Portion had masses of tan particles covering the top of the fiber layer. The fabric layer had a greenish tinge when examined at a slight angle, rather than tan when examined directly from the top. There were a few small tan particles on the felt-like nonwoven material.

Direct microscopic examination of a sample of the tan particles on the fabric layer indicated a significant number of dispersed bacteria. Many of the bacteria were quite motile. There were some filamentous bacteria. The fabric layer sample also contained considerable algae, both green algae (such as Chlorella) and blue-green algae. A few strands of the blue-green algae Oscillatoria were noted, as well. The sample further contained diatom shells and flagellated protozoa.

A stained slide of the fabric layer showed large floc particles with dispersed bacteria. Some filamentous bacteria were observed, as well.

Slides were also made from the tan particles on the felt-like textile material under the fabric layer. Direct microscopic examination indicated the presence of dispersed bacteria; short fragments of filamentous bacteria; small, spherical green algae; spherical blue-green algae; and diatoms.

A stained slide of the felt-like textile material under the fabric layer contained dispersed bacteria; bacteria floc particles; short fragments of filamentous bacteria; and diatoms. The dispersed bacteria may have resulted from the breaking up of the floc particles during sample preparation.

(b) Bottom Portion of the Five Month Inlet Sample

The bottommost portion of the Five Month Inlet Sample was covered with a dark slime. Examination inside the middle of the sample indicated some tan slime on the foam particle surfaces. The felt-like textile material at the bottom of the floatation panel had some tan particles on the surface, as well.

A slide was made from material taken from the middle of the floatation panel. More particularly, the microbial growth was scraped off the surface area of the foam particles and suspended in water. Direct microscopic examination of the scraping indicated bacteria floc particles, dispersed bacteria, motile bacteria, short fragments of filamentous bacteria, and algae in a few of the bacteria floc particles. In fact, some of the floc particles were green from the algae.

A stained slide of the material taken from the middle of the floatation panel indicated the presence of larger filamentous bacteria. The large filamentous bacteria formed loose balls of filaments with bacteria attached, forming thin, bacteria floc particles, rather than the dense floc particles seen in the other two samples. There were also short fragments of the small filamentous bacteria.

A slide was also made from the liquid layer in the bottom of the sample container, which may have included liquid that had drained down from the top layer of the cover. Direct examination of the liquid sample indicated the presence of many differently shaped, highly motile bacteria. The sample also contained short, fragmented filamentous bacteria. There was also spherical, green algae, both in clumps and dispersed, along with spherical, blue-green algae. Large, motile Spirillum were also present, as well as large, motile, blue-green, diplo-cells.

The stained slide of the liquid layer contained dispersed bacteria, bacteria floc particles, short fragments of filamentous bacteria, and diatom shells.

ii. Five Month Southern Sample (a) Top Portion of Five Month Southern Sample

The fabric layer on the Top Portion of the Five Month Southern Sample was almost entirely covered with tan particles. In fact, many areas of the surface were solidly covered with tan material that resembled microbial growths. However, the felt-like textile material attached to the fabric layer had only a few black particles on its surface.

Slides were made of the tan particles on the top of the fabric layer. Direct microscopic examination of the slide showed dispersed, highly motile bacteria; short fragments of thin bacteria filaments; large, filamentous bacteria; a number of Chlorella; and several motile, flagellated protozoa. The stained slide of the tan particles on the top of the fabric layer indicated dispersed bacteria, inert particles, and large filamentous bacteria forming clumps that other bacteria aggregated around.

Direct microscopic examination of the black particles on the felt-like textile layer indicated dispersed bacteria, motile bacteria, and short fragments of thin bacteria filaments. A stained slide of the felt-like textile layer indicated some bacteria floc particles, dispersed bacteria, and both large and small filamentous bacteria, with the large filaments forming clumps.

(b) Bottom Portion of Five Month Southern Sample

The bottom portion of the Five Month Southern Sample showed small areas of tan material on the foam particle surfaces. The felt-like textile layer attached to the bottom of the floatation panel had tan particles on one side and black particles on the opposite edge.

A slide was prepared from the middle of the Bottom Portion, i.e. the floatation panel portion, of the Five Month Southern Sample. The stained slide indicated the presence of dispersed bacteria, large filamentous bacteria that formed clumps of filaments with bacteria aggregating around the filaments, and a few bacteria forming tetrads.

Slides were made from the liquid collected at the bottom of the sample container. Direct microscopic examination of the slide showed dispersed, motile bacteria of all sizes and shapes, and fragments of thin filamentous bacteria. Bacteria floc particles were also present, as were tetrads, Chlorella, and dead nematodes. A stained slide of the liquid collected from the bottom of the container included darkly stained dispersed bacteria, poorly stained bacteria with clear centers, some fairly large bacteria, and short fragments of thin filamentous bacteria.

iii. General Observations on the Microbial Growth Within the Five Month Samples

A tan mat of microbial growth covered the top surface of the fabric layer for both the Inlet and Southern samples within the Five Month Sample Set. This microbial growth consisted of both bacteria and algae. The presence of green algae is a advantageous as it contributes dissolved oxygen for the other microorganisms to use. The presence of blue-green algae is advantageous in metabolizing $H_2S$.

A variety of other gas scrubbing microbes were indicated within the samples. For example, the primary bacteria in the Inlet Sample were filamentous bacteria, such as sulfide-oxidizing bacteria or methane-oxidizing bacteria. The stained slide for the South End indicated sulfide-oxidizing bacteria, both dispersed and in large filaments. The tetrads may indicate nitrifying bacteria.

Examination of a piece of the tan microbial mat from the fabric layer indicates the presence of a large number of clinoptilolite particles surrounded by microbial growth. Beneath the topmost portion of the fabric layer, the microbial growth tended to occur around the individual clinoptilolite particles, as well. Nevada clinoptilolite contains about 2,100 mg/kg P along with 15,800 mg/kg Fe and traces of cobalt, copper, nickel, molybdenum, manganese and zinc. Phosphorous and trace metals are known to aid in bacterial metabolism. Although not wishing to be bound by theory, bacterial metabolism, which tends to produce acidic by-products, may lower the pH around the clinoptilolite particles, resulting in the release of the phosphorus and the trace metals needed for bacteria growth.

iv. Solids Analysis

The solids analysis provided an estimate of the microbial solids within the samples. Each of the top and bottom portions of the Inlet and Southern Samples (four samples in total) was dried in a 105° C. controlled temperature oven for approximately 1 to 1.5 hrs. The samples were cooled to room temperature and weighed to determine the dry weight of the samples plus the microorganisms in each of the samples.

The dried solids on the surface of the fabric layers of the "top portion" samples were scraped off with the flat end of metal tweezers into clean petri dishes for temporary storage. Efforts were made to harvest as much of the dried surface microbes as possible. It was not possible to scrape any solids off the "bottom portion" samples.

Following scraping, each of the samples was placed in an individual jar and a commercial quaternary ammonium detergent applied. Following the addition of the detergent, the jar was filled a little over half full with tap water, a lid was placed on the jar and it was violently shaken about 20 to 25 times to thoroughly disperse the detergent within the sample. The lid was then removed and the liquid poured off. The jar was filled a little over half full with warm tap water again. The lid was replaced and the jar was violently shaken another 20 to 25 times. This procedure was repeated about 5 or 6 times. Following the detergent wash procedure, the sample was removed from the jar and rinsed with warm water for several minutes to ensure removal of all solids and detergent from the sample. The procedure was repeated for each of the four samples. The rinsed samples were dried at 105° C. for one hour, cooled and reweighed. The results of the solids analysis is provided in Table 6 below:

TABLE 6

Solids Analysis of the Five Month Samples

| Sample Location | Sample Size (cm × cm) | Total Solids Removed (g) | Total Solids Removed per Lagoon Cover Area (mg/cm$^2$) |
|---|---|---|---|
| Inlet Sample, Top Portion (1) | 3.2 × 4.5 | 2.113 g | 147 |
| Inlet Sample, Bottom Portion (2) | 3 × 3 | 0.681 g | 76 |
| Total Inlet Sample Solids | | | 223 |
| Southern Sample, Top Portion (3) | 3 × 4.5 | 1.686 g | 125 |
| Southern Sample, Bottom Portion (4) | 3 × 3 | 0.173 g TS | 19 |
| Total Southern Sample Solids | | | 144 |

The solids that had been removed from the two "top portion" samples and placed into the two separate petri dishes were placed into two weighed crucibles and reweighed to determine the solids scraped of the top of the two samples. The crucibles were then placed into a muffle furnace at 550° C. for 20 minutes to burn off the organic solids. The two crucibles were cooled back to room temperature in a desicator and weighed again to determine the loss in total solids.

There was 1.297 g of solids collected from the Inlet Sample Top Portion and 0.815 g of solids collected from the Southern Sample Top Portion prior to combustion.

After combustion, the data indicated the VS in the Inlet Sample Top Portion was 15% of the total solids. The VS in the Southern Sample Top Portion were 21% of the Total Solids. Consequently, the Inlet Sample Top Portion had 22 mg VS/cm$^2$ removed initially from the fabric layer. The South End Sample Top Cover had 26 mg VS/cm$^2$ top cover area removed initially from the fabric layer. Essentially, both samples showed about the same initial removal of VS from the fabric layer of the lagoon cover.

iv. Comparison Between Five Month Samples and Earlier Samples

The Five Month samples showed increased microbial growth over the two and three month sample sets. Thus the microbial activity appeared to increase as the lagoon cover has aged. The extent and diversity of the microbial growth that occurred within the lagoon cover indicates that gases are being metabolized as they diffuse through the cover.

d. Nine Month Sample

A single sample of the lagoon cover was collected for microscopic observation nine months after installation. Following collection, the single sample was split into two portions. The top portion included the fabric layer and a textile material. The bottom portion included the floatation panel.

i. Analysis of the Top Portion of the Nine Month Sample

The clinoptilolite particles in the fabric layer appeared to be covered with brown growth, appearing as tiny spheres. Two slides, one unstained and one stained, were prepared in order to observe the spheres. To prepare the slides, one or two of the brown spheres was collected and placed on each glass slide in a drop of de-mineralized water, using a sterile, plastic loop. The particles were then crushed and spread around each of the glass slides, again using the plastic loop. One slide was covered with a glass cover slip and examined microscopically as a wet smear. The other glass slide was allowed to air dry and was stained with methylene blue (MB) dye before being examined under the microscope. Both the wet smears and the stained slides were examined at 100× and 400×, using a Nikon Eclipse microscope.

The brown spheres on the clinoptilolite particles contained a considerable amount of bacteria, both motile and non-motile. Various sizes and shapes of bacteria were present, including many filamentous bacteria. A few green, spherical organisms, probably the algae Chlorella, were also present. Numerous diplo cells were also present, indicating a rapidly growing bacteria culture. The bacteria appear to utilize nutrients from the off-gases emitted by the anaerobic lagoon with minerals being supplied by the clinoptilolite and/or dust from the air. However, the bacteria growing around the clinoptilolite particles had limited moisture. This lack of excess moisture appeared to prevent protozoa from growing with the bacteria at the cover surface. Further, the metabolism by the bacteria in the brown spheres may be both aerobic and anaerobic.

A set of slides was also prepared from liquid squeezed from the textile layer. The slide set was prepared as above, with one slide intended for direct microscopic examination and one slide stained with methylene blue dye.

The liquid squeezed from the textile layer contained many different types of active protozoa. The protozoa present ranged from the very tiny flagellated protozoa to medium sized, free-swimming ciliated protozoa, as well as stalked ciliated protozoa, Vorticella. The Vorticella, essentially large, free-swimming ciliated protozoa, were present in an amount of about 6 to 8 cells in every field of view at 100×. The large number of active protozoa in the sample indicated that this layer was aerobic. The large number of protozoa also indicated a large number of bacteria were probably growing on a continuous basis. The presence of large numbers of diplo-cells also indicated a rapidly growing group of bacteria.

The liquid from the textile layer did, in fact, contain many dispersed bacteria that were actively motile, as well as short filamentous bacteria. There were some small bacteria floc particles present, as well. The stained slide indicated both filamentous bacteria and dispersed bacteria.

ii. Analysis of the Bottom Portion of the Nine Month Sample

A very heavy, dark brown slime layer, about ½ to ¾ inches in depth, was present on one side of the floatation panel. The slime layer was dispersed in water and a set of glass slides was prepared in the manner described above. The slime layer contained large numbers of bacteria, including many short, bacteria filaments and individual bacteria, as well. Floc particles were also noted. Protozoa were also present. The stained slide indicated the presence of both dispersed and filamentous bacteria. The ratio of bacteria to protozoa indicated that the metabolism within the lower portion of the slime layer was probably anaerobic, with an aerobic fraction in the upper portion of the slime layer.

iii. Comparison of the Nine Month Sample with Previous Samples

Overall, a definite increase in bacteria numbers were noted over the previous samples. The diversity of protozoa as also far greater than in previous samples. Anaerobic lagoons are expected to produces methane, carbon dioxide, ammonia, hydrogen sulfide, and water vapor as gaseous end products. The results indicate that these gaseous products stimulate the growth of large numbers of bacteria and protozoa in the permeable cover. More particularly, the bacterial growth observed within the nine month sample indicated utilization of nutrients from the gases and/or wastewaters diffusing into or through the lagoon cover.

Also, the amount of bacteria growth within the floatation panel was greater in this sample than in the three previous samples. The warmer temperature in the anaerobic lagoon may have increased the metabolism of bacteria within the lagoon depths, generating more off-gases, such as methane and carbon dioxide. The tiny gas bubbles could have lifted some settled solids to the water surface and provided a concentrated food source in contact with the floatation panel. Such an increase in nutrients would have stimulated the heavy bacterial growth observed.

e. Conclusion

Based on the foregoing nine month microbiological study, the lagoon covers of the present invention appear to provide a substrate on which a bioactive population can be sustained and flourish over a significant period of time.

Temperature Testing and Results

Temperature testing was begun approximately six weeks following installation. In an initial temperature study, air and lagoon surface temperature measurements were taken for nine consecutive days. The data from the initial study are summarized in Table 7.

TABLE 7

Initial Temperature Study
Maximum And Minimum Air And Lagoon Cover
Surface Temperatures, °C.,

| Day | Maximum Air Temperature | Minimum Air Temperature | Maximum Cover Temp. | Minimum Cover Temp. |
|---|---|---|---|---|
| 1 | 27 | 20 | 35 | 20 |
| 2 | 25 | 17 | 34 | 16 |
| 3 | 27 | 15 | 38 | 14 |
| 4 | 30 | 17 | 40 | 16 |
| 5 | 32 | 20 | 42 | 18 |
| 6 (rain) | 30 | 20 | 42 | 20 |
| 7 | 32 | 19 | 47 | 18 |
| 8 | 26 | 21 | 41 | 21 |
| 9 | 25 | 16 | 38 | 14 |
| 10 | 24 | 16 | 39 | 13 |

As indicted in Table 7 by a comparison of the Maximum Air Temperature versus Maximum Cover Temperature for each day, the cover surface appears to absorb solar energy. More particularly, the Maximum Cover Temperature exceeded the Maximum Air Temperature each day. A comparison of the Maximum Cover Temperature and Minimum Cover Temperature indicates that the cover subsequently dissipates the absorbed energy each day.

Approximately three months after installation, a second temperature study was undertaken. In the second study, temperature loggers measured both the surface temperature of the lagoon cover and the temperature at a six inch water depth within the covered lagoon for a one week time period. As a control, the temperature at a six inch depth was also measured in a similarly sized nearby uncovered lagoon during the same time period. Temperature comparisons for the temperature study undertaken at approximately the three month mark are provided in Table 8.

TABLE 8

Second Temperature Study, ° C.

| Day | Lagoon Cover surface high temp. | Lagoon Cover surface low temp. | Covered lagoon, Six inch depth high temp. | Covered lagoon six inch depth low temp. | Uncovered lagoon six inch depth high temp. | Uncovered lagoon six inch depth low temp. |
|---|---|---|---|---|---|---|
| 1 | 36 |  | 24 | 24 | 26 |  |
| 2 | 36 | 8 | 24 | 24 | 28 | 23 |
| 3 | 36 | 10 | 24 | 24 | 27 | 23 |
| 4 | 37 | 15 | 24 | 24 | 26 | 22 |
| 5 | 24 | 17 | 24 | 24 | 23 | 22 |
| 6 | 41 | 16 | 24 | 24 | 32 | 21 |
| 7 | 43 | 10 | 24 | 24 | 33 | 22 |

The data indicates that the lagoon cover effectively absorbs solar energy during the day and radiates energy during the night. The cover provides an effective insulator, as evidenced by a the constant 24° C. water temperature at the six inch depth in the covered lagoon. Although the surface of the lagoon cover reached a daytime temperature in excess of 109° F. (42.8° C.), this heat was not transferred to the water surface due to the insulating properties of the cover material. The cover further reduced the diurnal temperature fluctuations of the water surface to less than 2° F. (1° C.). In contrast, water at the 6 inch depth in the uncovered lagoon varied by up to 1° C. in a single day.

Ammonia Testing and Results

Ammonia concentrations in the air one foot above the lagoon surface was determined. Ammonia concentrations were measured using benuder tubes suspended over the lagoon for a period of four to six hours per measurement. Measurements were made in duplicate twice a day. Air temperatures were relatively uniform during the testing period, ranging from 16° C. at night to a high of 33° C. during the day.

To provide a direct comparison, measurements were made on the same lagoon both before and after the lagoon cover was installed. Initially, the ammonia concentration over the uncovered lagoon was measured for approximately a 7 day period. The ammonia concentration over the covered lagoon was then determined for approximately a 17 day period. Intense rains occurred immediately prior to and twice during the testing of the covered lagoon. These ammonia concentration data are summarized in Table 9.

TABLE 9

Ammonia Concentrations
Measured One Foot Above The Lagoon Surface,
(Micro Grams Per Cubic Meter, ppb)

| Samples Taken | Number of Measurements | Ammonia Concentration Range | Ammonia Concentration Median |
|---|---|---|---|
| Before installation of the lagoon cover | 32 | 340–1,660 | 950 |
| After installation of the lagoon cover | 25 | 40–420 | 200 |

The considerable scatter in the data was due to differing wind conditions and temperatures at the time of sampling. However, the data nevertheless indicate that the lagoon covers provide an approximately eighty percent reduction in ammonia emission rate compared to uncovered lagoons. Consequently, the field test confirmed measurements taken under more controlled laboratory conditions.

Human observation confirmed that the lagoon cover resulted in a nearly complete blockage of odor from the lagoon surface. This result is surprising in that it takes a large number of bacteria to produce measurable changes within gas compositions. In addition to its benefit in odor reduction, the lagoon cover prevented wind sweeping of the lagoon surface, as well.

That which is claimed:

1. A floatation panel comprising:
    a plurality of polymeric foam particles arranged in a piled laminate structure, at least a portion of said foam particles exhibiting a surface energy differential in comparison to water sufficient to wick an adequate amount of said water onto said foam particles to collectively sustain a biofilm supported by said floatation panel;
    at least a portion of said polymeric foam particles within said piled laminate structure bonded to at least one adjoining foam particle positioned either above or below said foam particle;
    said piled laminate structure further defining a first face and an opposing second face, said first face contacting an aqueous waste slurry at or near its surface,
    wherein at least a portion of said foam particles exhibit sufficient buoyancy to collectively float said floatation panel in said aqueous waste slurry, said foam particles further arranged within said piled laminate structure so as to define interstices between at least a portion of said foam particles, said interstices of sufficient size and quantity to allow gases and rainwater to flow through said piled laminate structure.

2. A floatation panel according to claim 1, further comprising a fabric layer covering at least a portion of said second face.

3. A floatation panel according to claim 2, wherein said fabric layer further comprises entrapped adsorbent material.

4. A floatation panel according to claim 3, wherein said adsorbent material is selected from zeolite, peat moss, activated carbon, and mixtures thereof.

5. A floatation panel according to claim 4, wherein said adsorbent material is zeolite.

6. A floatation panel according to claim 5, wherein said adsorbent material is present within said fabric in amounts ranging from about 0.5 to 10 $lb/ft^2$.

7. A floatation panel according to claim 2, wherein said fabric layer is formed from a fiber mixture including a first portion of fibers having a denier ranging from about 15 to 45 and a second portion of fibers having a denier ranging from about 3 to 10 denier.

8. A floatation panel according to claim 2, wherein said fabric layer is formed from one or more fibers selected from polyester, nylon, glass, acrylic, flax, and polyolefin.

9. A floatation panel according to claim 2, wherein said fabric layer is formed from polyester and acrylic fiber.

10. A floatation panel according to claim 2, wherein said fabric layer is a nonwoven fabric.

11. A floatation panel according to claim 2, wherein said fabric layer exhibits a fabric weight ranging from about 14 $oz/yd^2$ to 35 $oz/yd^2$.

12. A floatation panel according to claim 1, wherein said polymeric foam particles are formed from one or more polymers selected from polyolefin, polyvinyl acetate, and polyurethane.

13. A floatation panel according to claim 12, wherein said polyolefin is selected from the group consisting of polyethylene, polypropylene and mixtures thereof.

14. A floatation panel according to claim 1, wherein said polymeric foam particles are bonded by means selected from thermal bonding, needlepunching, stitching and chemically binding.

15. A floatation panel according to claim 14, wherein said polymeric foam particles are thermally bonded.

16. A floatation panel according to claim 14, wherein said polymeric foam particles are bonded by needlepunching.

17. A floatation panel according to claim 14, wherein said polymeric foam particles are bonded by chemically binding.

18. A floatation panel according to claim 1, wherein said polymeric foam particles have a diameter in the range of from about 0.5 to 2.0 inches.

19. A floatation panel according to claim 1, wherein the thickness between said first and second face ranges from about 0.5 to about 4.0 inches.

20. A floatation panel according to claim 1, wherein said floatation panel exhibits a density ranging from about 1.5 to about 4.0 $lb/ft^3$.

21. A floatation panel according to claim 1, further comprising a fabric bonded to at least a portion of said first face.

22. A floatation panel according to claim 21, wherein said fabric bonded to said first face is selected from the group consisting of woven, nonwoven, knit and net fabric.

23. A floatation panel according to claim 1, wherein said aqueous waste slurry is formed from animal waste.

24. A floatation panel comprising:
a plurality of polymeric foam particles arranged in a piled laminate structure, at least a portion of said foam particles exhibiting a surface energy differential in comparison to water sufficient to wick an adequate amount of said water onto said foam particles to collectively sustain a biofilm supported by said floatation panel;
at least a portion of said polymeric foam particles within said piled laminate structure bonded to at least one adjoining foam particle positioned either above or below said foam particle;
said piled laminate structure defining a first face and opposing second face, said first face designed to contact an aqueous waste slurry at or near its surface,
at least a portion of said foam particles exhibiting sufficient buoyancy to collectively float said floatation panel in said aqueous waste slurry, said foam particles further arranged within said piled laminate structure so as to define interstices between at least a portion of said foam particles, said interstices further of sufficient size and quantity to allow gases and rainwater to flow through said piled laminate structure,
at least a portion of said second face further covered by a fabric layer capable of entrapping adsorbent material therein, said fabric layer further including said adsorbent material in an amount ranging from about 0.5 to 10 $lb/ft^2$.

25. A waste material confinement area cover comprising:
at least two floatation panels, said floatation panels each comprising
a plurality of polymeric foam particles arranged in a piled laminate structure, at least a portion of said foam particles exhibiting a surface energy differential in comparison to water sufficient to wick an adequate amount of said water onto said foam particles to collectively sustain a biofilm supported by said floatation panel;
at least a portion of said polymeric foam particles within said piled laminate structure bonded to at least one adjoining foam particle positioned either above or below said foam particle;
said piled laminate structure further defining a first face and opposing second face, said first face designed to contact an aqueous waste slurry at or near its surface,
wherein at least a portion of said foam particles exhibit sufficient buoyancy to collectively float said floatation panel in said aqueous waste slurry, said foam particles further arranged within said piled laminate structure so as to define interstices between at least a portion of said foam particles, said interstices of sufficient size and quantity to allow gases and rainwater to flow through said piled laminate structure; and
a fabric layer bonded to at least a portion of said second faces of said at least two floatation panels to join said at least two of floatation panels into a single unit.

26. A cover according to claim 25, wherein said fabric layer is formed from one or more fibers selected from polyester, nylon, glass fiber, acrylic, flax, and polyolefin.

27. A cover according to claim 25, wherein said fabric layer is formed from polyester and acrylic fiber.

28. A cover according to claim 25, wherein said fabric layer further comprises entrapped adsorbent material.

29. A cover according to claim 28 wherein said adsorbent particulate material is present in an amount ranging from about 0.5 to 10 $lb/ft^2$.

30. A cover according to claim 25, wherein said polymeric foam particles are formed from one or more polymers selected from polyolefin, ethylene vinyl acetate and polyurethane.

31. A cover according to claim 30, wherein said polyolefin is selected from the group consisting of polyethylene, polypropylene and mixtures thereof.

32. A waste lagoon cover according to claim 25, wherein said polymeric foam particles are formed from closed cell foam.

33. A cover according to claim 25, wherein said polymeric foam particles are bonded by at least one means selected from thermal bonding, needlepunching, stitching and chemically binding.

34. A cover according to claim 33, wherein said polymeric foam particles are thermally bonded.

35. A cover according to claim 33, wherein said polymeric foam particles are bonded by needlepunching.

36. A cover according to claim 33, wherein said polymeric foam particles are bonded by chemically binding.

37. A cover according to claim 25 wherein said cover exhibits a bouyancy ranging from about 0.5 to 6 $lb/ft^2$.

38. A cover according to claim 25, wherein said waste lagoon cover is capable of decreasing ammonia emissions from a waste lagoon by a minimum of about 44%.

39. A waste treatment system comprising:
a waste material confinement area containing organic waste and further supporting anaerobic microorganisms below the surface of said water; and
a waste material confinement area cover spanning the surface of said waste material confinement area, said waste material confinement area cover comprising
at least two floatation panels, said floatation panels each comprising
a plurality of polymeric foam particles arranged in a piled laminate structure, at least a portion of said foam particles exhibiting a surface energy differential in comparison to water sufficient to wick an adequate amount of said water onto said foam particles to collectively sustain a biofilm supported by said floatation panel;
at least a portion of said polymeric foam particles within said piled laminate structure bonded to at least one adjoining foam particle positioned either above or below said foam particle;
said piled laminate structure further defining a first face and opposing second face, said first face contacting said waste material confinement area at or near its surface;
wherein at least a portion of said foam particles exhibit sufficient buoyancy to collectively float said floatation panel in said waste material confinement area, said foam particles further arranged within said piled laminate structure so as to define interstices between at least a portion of said foam particles, said interstices of sufficient size and quantity to allow gases and rainwater to flow through said piled laminate structure; and
a fabric layer bonded to at least a portion of said second faces of said at least two floatation panels to join said at least two of floatation panels into a single unit.

40. A waste treatment system according to claim 39, wherein said waste treatment system further includes an anchor to secure said waste material confinement area cover around the perimeter of said waste material confinement area.

41. A method of waste water treatment comprising:

supplying organic waste to a waste material confinement area;

covering the surface of the waste material confinement area with a waste material confinement area cover comprising
- at least two floatation panels, each of said floatation panels comprising
    - a plurality of polymeric foam particles arranged in a piled laminate structure, at least a portion of said foam particles exhibiting a surface energy differential in comparison to water sufficient to wick an adequate amount of water onto the foam particles to collectively sustain a biofilm supported by the floatation panel;
    - at least a portion of the polymeric foam particles within the piled laminate structure bonded to at least one adjoining foam particle positioned either above or below the foam particle;
    - the piled laminate structure further defining a first face and opposing second face, the first face contacting the waste material confinement area at or near its surface;
    - wherein at least a portion of the foam particles exhibit sufficient buoyancy to collectively float the floatation panel in the waste material confinement area, the foam particles further arranged within the piled laminate structure so as to define interstices between at least a portion of the foam particles, the interstices of sufficient size and quantity to allow gases and rainwater to flow through the piled laminate structure; and
    - a fabric layer bonded to at least a portion of the second faces of the at least two floatation panels to join the at least two of floatation panels into a single unit;

providing an anchor around the perimeter of the waste material confinement area; and securing said waste material confinement area cover with said anchor.

42. A method of waste water treatment comprising:

anaerobically digesting organic waste within the depths of a waste material confinement area, said anaerobic digestion producing off-gases, and scrubbing said off-gases emitted by said anaerobic digestion by diffusing said off-gases through a floatation panel comprising
- a plurality of polymeric foam particles arranged in a piled laminate structure, at least a portion of said foam particles exhibiting a surface energy differential in comparison to water sufficient to wick an adequate amount of water onto the foam particles to collectively sustain a biofilm supported by the floatation panel;
- at least a portion of the polymeric foam particles within the piled laminate structure bonded to at least one adjoining foam particle positioned either above or below the foam particle;
- the piled laminate structure further defining a first face and opposing second face, the first face contacting the waste material confinement area at or near its surface;
- at least a portion of said foam particles exhibiting sufficient buoyancy to collectively float the floatation panel in the waste material confinement area, the foam particles arranged within the piled laminate structure so as to define interstices between at least a portion of the foam particles, the interstices of sufficient size and quantity to allow gases and rainwater to flow through the piled laminate structure;

and emitting the scrubbed gas stream into the atmosphere.

43. A method of waste water treatment according to claim 42 further comprising passing the scrubbed gas stream through adsorbent filtration media prior to emitting the scrubbed gases into the atmosphere.

44. A method of waste water treatment according to claim 43, wherein said step of passing the scrubbed gas stream through an adsorbent filtration media further comprises passing the scrubbed gas stream through a layer of fabric that further includes entrapped adsorbent material.

\* \* \* \* \*

UNITED STATES PATENT AND TRADEMARK OFFICE
CERTIFICATE OF CORRECTION

PATENT NO. : 6,558,548 B2
DATED : May 6, 2003
INVENTOR(S) : Svirklys et al.

It is certified that error appears in the above-identified patent and that said Letters Patent is hereby corrected as shown below:

Title page,
Item [56], References Cited, U.S. PATENT DOCUMENTS,
"5,105,496 A   4/1992  Gray, Jr. et al." should read
-- 5,106,496 A   4/1992  Cournoyer et al. --;

"6,022,479 A   2/2000  Smirnov" should read
-- 6,022,476 A   2/2000  Hausin --.

Signed and Sealed this

Sixteenth Day of September, 2003

JAMES E. ROGAN
*Director of the United States Patent and Trademark Office*